United States Patent
Bosch et al.

(10) Patent No.: US 9,769,217 B2
(45) Date of Patent: Sep. 19, 2017

(54) PROVIDING CELLULAR-SPECIFIC TRANSPORT LAYER SERVICE BY WAY OF CELL-SITE PROXYING IN A NETWORK ENVIRONMENT

(71) Applicant: CISCO TECHNOLOGY, INC., San Jose, CA (US)

(72) Inventors: Hendrikus G. P. Bosch, Aalsmeer (NL); Paul A. Polakos, Marlboro, NJ (US); Humberto J. La Roche, Ocean, NJ (US); Mahavir Dagdulal Karnavat, Maharashtra (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/086,734

(22) Filed: Nov. 21, 2013

(65) Prior Publication Data
US 2015/0139075 A1     May 21, 2015

(51) Int. Cl.
*H04L 29/06*        (2006.01)

(52) U.S. Cl.
CPC ........ *H04L 65/1069* (2013.01); *H04L 65/105* (2013.01)

(58) Field of Classification Search
None
See application file for complete search history.

(56) References Cited

U.S. PATENT DOCUMENTS

| | | | |
|---|---|---|---|
| 7,953,820 | B2 | 5/2011 | Stevens |
| 8,693,233 | B2 | 4/2014 | Scheuerlein et al. |
| 9,253,810 | B2 | 2/2016 | Kaczmarska-Wojtania et al. |
| 9,300,453 | B2 | 3/2016 | Kaczmarska-Wojtania et al. |
| 9,392,025 | B2 | 7/2016 | Bosch et al. |
| 2002/0187777 | A1 | 12/2002 | Osterhout |
| 2003/0076815 | A1 | 4/2003 | Miller et al. |

(Continued)

FOREIGN PATENT DOCUMENTS

EP     2876914     5/2015

OTHER PUBLICATIONS

USPTO Apr. 23, 2015 Non-Final Office Action from U.S. Appl. No. 14/086,754.

(Continued)

*Primary Examiner* — Derrick Ferris
*Assistant Examiner* — Manuel Rangel
(74) *Attorney, Agent, or Firm* — Patterson + Sheridan, LLP (57) ABSTRACT

A method is provided in one example embodiment and includes receiving a first request from a first user equipment by a first transport layer proxy located within an access network The first request includes a request to establish a user session between the first user equipment and a remote server. The method further includes establishing a first transport layer session between the first user equipment and the first transport layer proxy, establishing a second transport layer session between the first transport layer proxy and the remote server, and establishing a first control channel between the first transport layer proxy and a transport layer function manager within a core network. The method further includes sending session state parameters associated with the first transport layer session and the second transport layer session to the transport layer function manager using the first control channel.

27 Claims, 6 Drawing Sheets

(56) References Cited

U.S. PATENT DOCUMENTS

| | | | |
|---|---|---|---|
| 2004/0133683 | A1 | 7/2004 | Keller et al. |
| 2007/0162599 | A1 | 7/2007 | Nguyen |
| 2008/0305784 | A1 | 12/2008 | Dillinger et al. |
| 2009/0116477 | A1 | 5/2009 | Belling et al. |
| 2010/0098096 | A1 | 4/2010 | Yang |
| 2010/0106845 | A1 | 4/2010 | Hu et al. |
| 2010/0153561 | A1* | 6/2010 | Capone et al. ............... 709/227 |
| 2011/0028120 | A1 | 2/2011 | Wu |
| 2011/0035437 | A1* | 2/2011 | Toumura ........... H04L 29/12066 709/203 |
| 2011/0051683 | A1* | 3/2011 | Ramankutty et al. ........ 370/331 |
| 2011/0070906 | A1 | 3/2011 | Chami et al. |
| 2011/0182291 | A1* | 7/2011 | Li ..................... H04L 29/12066 370/389 |
| 2011/0310731 | A1 | 12/2011 | Park et al. |
| 2012/0082093 | A1 | 4/2012 | Andreasen et al. |
| 2012/0082094 | A1 | 4/2012 | Andreasen et al. |
| 2012/0082132 | A1* | 4/2012 | Andreasen et al. .......... 370/331 |
| 2012/0084388 | A1 | 4/2012 | De Foy et al. |
| 2012/0102174 | A1 | 4/2012 | Zhou et al. |
| 2012/0173661 | A1 | 7/2012 | Mahaffey et al. |
| 2012/0209942 | A1 | 8/2012 | Zehavi et al. |
| 2013/0007286 | A1 | 1/2013 | Mehta et al. |
| 2013/0016677 | A1 | 1/2013 | Kunz et al. |
| 2013/0018978 | A1 | 1/2013 | Crowe et al. |
| 2013/0097309 | A1* | 4/2013 | Ma et al. ...................... 709/224 |
| 2013/0173756 | A1 | 7/2013 | Luna et al. |
| 2014/0051437 | A1 | 2/2014 | Diachina et al. |
| 2014/0064177 | A1 | 3/2014 | Anchan |
| 2014/0064249 | A1* | 3/2014 | Lee et al. ...................... 370/331 |
| 2014/0233384 | A1* | 8/2014 | Howard ......................... 370/235 |
| 2014/0241158 | A1* | 8/2014 | Anthony et al. .............. 370/235 |
| 2014/0378105 | A1 | 12/2014 | Suryavanshi |
| 2016/0277168 | A1 | 9/2016 | Kaczmarska-Wojtania et al. |

OTHER PUBLICATIONS

U.S. Appl. No. 14/086,781, filed Nov. 21, 2013, entitled "Providing In-Line Services Through Radio Access Network Resources Under Control of a Mobile Packet Core in a Network Environment," Inventors: Malgorzata Kaczmarska-Wojtania, et al.

U.S. Appl. No. 14/086,701, filed Nov. 21, 2013, entitled "Subscriber Dependent Redirection Between a Mobile Packet Core Proxy and a Cell Site Proxy in a Network Environment," Inventors: Hendrikus G. P. Bosch, et al.

U.S. Appl. No. 14/086,754, filed Nov. 21, 2013, entitled "Localizing a Mobile Data Path in a Radio Access Network Under Control of a Mobile Packet Core in a Network Environment," Inventors: Malgorzata Kaczmarska-Wojtania, et al.

"AAA protocol," Wikipedia, the free encyclopedia, Feb. 13, 2014, 4 pages http://en.wikipedia.org/w/index.php?title=AAA_protocol &oldid =595247372.

"GPRS core network," Wikipedia, the free encyclopedia, Mar. 15, 2014, 10 pages, http://en.wikipedia.org/w/index.php?title=GPRS_core_network&oldid=599684316.

"GPRS Tunnelling Protocol," Wikipedia, the free encyclopedia, Feb. 13, 2014, 11 pages, http://en.wikipedia.org/w/index.php?title=GPRS_Tunnelling_Protocol&oldid=595292488.

"Lawful Interception," Wikipedia, the free encyclopedia, Dec. 24, 2013, 11 pages http://en.wikipedia.org/w/index.php?title=Lawful_interception&oldid=587527305.

"Proxy Server," Wikipedia, the free encyclopedia, Mar. 17, 2014, 21 pages http://en.wikipedia.org/w/index.php?title=Proxy_server &oldid=600031885.

GPP-TS-29.281-V9.2.0 (Mar. 2010), 3rd Generation Partnership Project; Technical Specification Group Core Network and Terminals; General Packet Radio System (GPRS) Tunnelling Protocol User Plane (GTPv1-U) (Release 9), 3GPP Organizational Partners, Mar. 2010, 24 pages.

USPTO May 21, 2015 Non-Final Office Action from U.S. Appl. No. 14/086,781.

USPTO Oct. 5, 2015 Notice of Allowance from U.S. Appl. No. 14/086,754.

EPO Jun. 3, 2015 Extended Search Report and Written Opinion from European Application Serial No. 14194359.

USPTO Mar. 28, 2016 Notice of Allowance from U.S. Appl. No. 14/086,701.

USPTO Nov. 25, 2015 Non-Final Office Action from U.S. Appl. No. 14/086,781.

USPTO Dec. 3, 2015 Non-Final Office Action from U.S. Appl. No. 14/086,701.

U.S. Appl. No. 14/989,133, filed Jan. 6, 2016, entitled "Localizing a Mobile Data Path in a Radio Access Network Under Control of a Mobile Packet Core in a Network Environment," Inventors: Malgorzata Kaczmarska-Wojtania, et al.

U.S. Appl. No. 15/082,218, filed Mar. 28, 2016, entitled "Providing In-Line Services Through Radio Access Network Resources Under Control of a Mobile Packet Core in a Network Environment," Inventors: Malgorzata Kaczmarska-Wojtania, et al.

USPTO Aug. 11, 2016 Non-Final Office Action from U.S. Appl. No. 15/082,218.

USPTO Oct. 28, 2016 Notice of Allowance from U.S. Appl. No. 14/989,133.

USPTO Nov. 25, 2016 Notice of Allowance from U.S. Appl. No. 15/082,218.

\* cited by examiner

PROVIDING CELLULAR-SPECIFIC TRANSPORT LAYER SERVICE BY WAY OF CELL-SITE PROXYING IN A NETWORK ENVIRONMENT

TECHNICAL FIELD

This disclosure relates in general to the field of communications and, more particularly, to providing cellular-specific transport layer service by way of cell-site proxying in a network environment.

BACKGROUND

Today, a mobile user's data session is anchored on a mobile gateway such as a (GGSN, PGW) working as part of a mobile packet core. Anchoring the mobile data session on the mobile gateway includes anchoring both control and data traffic flows between the user's device and the mobile gateway. Control traffic is exchanged between the user's device and the gateway, and then terminated on the gateway. In an uplink direction, the data traffic is decapsulated from a mobile encapsulation protocol and presented on a Gi interface as Internet Protocol (IP) packets. The data traffic is then often sent either to a service provider private network to deliver services or service provider private content, or is sent to the Internet for content delivery. The mobile gateway terminates tunnel encapsulation specific to the mobile network and presents IP traffic on its Internet facing interface. The mobile gateway is also responsible to applying various services to the data stream based on a user profile. Examples of such services include quality of service (QoS), deep packet inspection, traffic management, lawful intercept, http header enrichment as well as billing the data stream sent to and/or from the user. These services are applied in the mobile packet core, and mobile operators typically have a complete infrastructure to provide these services to the mobile user based on his or her profile. All of the data traffic between the user equipment and its termination point in both the uplink and downlink directions passes via the mobile gateway.

Some Radio Access Network (RAN) vendors enable the execution of "services" inside a base station. These services may run as an application on virtual machines, and the virtual machines may be hosted on the base station's processing infrastructure. All (GTP-based) traffic sent from and received by the base station is routed through the base station hosted "services" to enable in-line service delivery on per-subscriber packet stream. The idea is that by hosting services in the base station, caching, storing and latency saving functions can execute and optimize for the wireless specifics. These services operate "on-top-of" the cellular infrastructure and are not integrated into the cellular networking standards.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a first request from a first user equipment by a first transport layer proxy located within an access network The first request includes a request to establish a user session between the first user equipment and a remote server. The method further includes establishing a first transport layer session between the first user equipment and the first transport layer proxy, establishing a second transport layer session between the first transport layer proxy and the remote server, and establishing a first control channel between the first transport layer proxy and a transport layer function manager within a core network. The method further includes sending session state parameters associated with the first transport layer session and the second transport layer session to the transport layer function manager using the first control channel.

In a particular embodiment, the method further includes sending network address information of the first transport layer proxy to the transport layer function manager. In another particular embodiment, the method further includes allocating the session state parameters to the first transport layer session and the second transport layer session by the first transport layer proxy. In another particular embodiment, the session state parameters include a first protocol control block associated with the first transport layer session and a second protocol control block associated with the second transport layer session. In still another particular embodiment, at least one of the first protocol control block and the second protocol control block include one or more of a source network address, a destination network address, a source port, and a destination port associated with the user session.

In another particular embodiment, the control channel is an out-of-band channel between the first transport layer proxy and the transport layer function manager. In another particular embodiment, the method further includes optimizing operating parameters of the first transport layer session based upon wireless channel conditions experienced by the first user equipment.

In other particular embodiments, the first transport layer proxy resides within a first base station and the transport layer function manager resides within a packet gateway. In other particular embodiments, the method further includes receiving an uplink transport layer packet associated with the user session by a second transport layer proxy from the first user equipment, determining whether the session state parameters associated with the user session are known to the second transport layer proxy, requesting the session state parameters from the transport layer function manager when the session state parameters are not known to the second transport layer proxy, and receiving the session state parameters from the first transport layer proxy or the transport layer function manager.

In still another particular embodiment, the method further includes establishing a transport layer user session between the first user equipment and the remote server using the session state parameters, and forwarding the uplink transport layer packet to the remote server by the second transport layer proxy using the transport layer user session. In still another particular embodiment, the uplink transport layer packet is received by second transport layer proxy when the first user equipment experiences handover between a first base station including the first transport layer proxy and a second base station including the second transport layer proxy.

Example Embodiments

Figure 1:
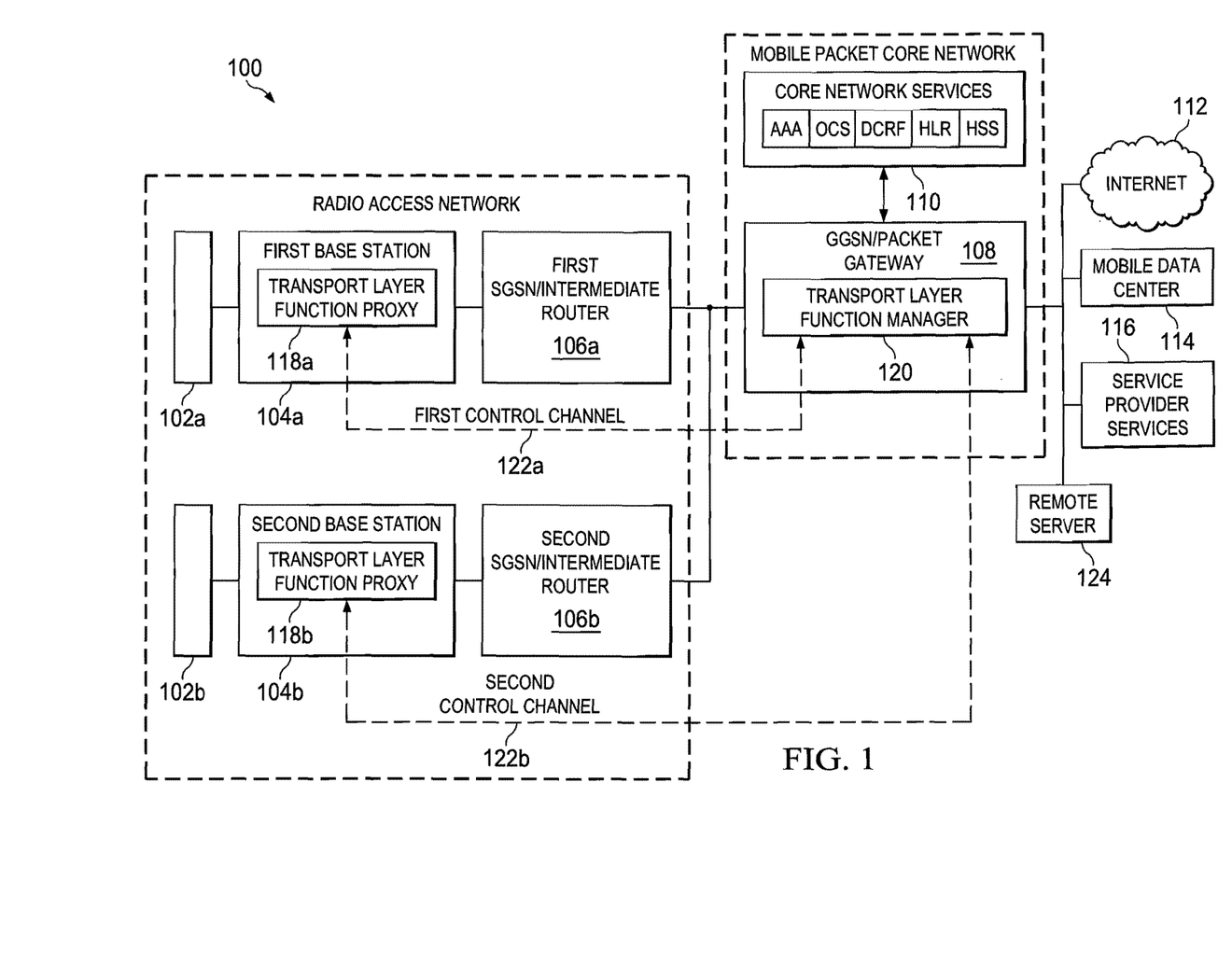
FIG. 1 is a simplified block diagram of an example embodiment of a communication system for providing cellular-specific transport layer service by way of cell-site proxying in a network environment.

Turning to FIG. 1, FIG. 1 is a simplified block diagram of an example embodiment of a communication system 100 for providing cellular-specific transport layer service by way of cell-site proxying in a network environment. The particular embodiment illustrated in FIG. 1 is shown as including general packet radio service (GPRS) network elements. However, it should be understood that in other embodiments any other suitable network elements may be used. The communication system of FIG. 1 includes first user equipment (UE) 102a and second user equipment 102b. First user equipment 102a may connect wirelessly to a first base station 104a and second user equipment 102b may connect wirelessly to a second base station 104b. In one or more embodiments, first base station 104a and second base station 104b are mobile base stations of a radio access network (RAN). In a particular embodiment, first base station 104a and second base station 104b are each an Evolved Node B (eNodeB) Long Term Evolution (LTE) base station node. In still other embodiments, first base station 104a and second base station 104b are each a Universal Mobile Telecommunications System (UMTS) base station node. First base station 104a may be further connected to a first Serving GPRS support node (SGSN) and/or intermediate router 106a, and second base station 10b may be further connected to a second SGSN/intermediate router 106b. An SGSN, such as first SGSN/intermediate router 106a and second SGSN/intermediate router 106b may be responsible for the delivery of data packets from and to user equipment within its geographical service area. Its tasks may include packet routing and transfer, mobility management, logical link management, and authentication and charging functions.

Each of first SGSN/intermediate router 106a and second SGSN/intermediate router 106b may be further connected to a Gateway GPRS support node (GGSN)/packet gateway (PGW) 108 within a mobile core network. GGSN/PGW 108 may be further connected to one or more core network services 110 within the mobile core network. Core network services 110 may include authentication, authorization, and accounting (AAA) services, billing services, policy services, and other core network services. In the particular embodiment illustrated in FIG. 1, the core network services may include AAA services, an online charging system (OCS), a policy and charging rules function (PCRF), a home location register (HLR), and a home subscriber server. GGSN/PGW 108 may be further connected to the Internet 112, a mobile data center 114, and service provider services 116. In a particular embodiment, GGSN/PGW 108 is responsible for the internetworking between the GPRS network and external packet switched networks such as the Internet and X.25 networks. In particular embodiments, GGSN/PGW 108 is an anchor point that enables mobility of user equipment 102a-102b in GPRS/UMTS networks and maintains routing information necessary to tunnel protocol data units (PDUs) to the SGSN that services the particular user equipment 102a-102b, e.g. one or more mobile stations. GGSN/PGW 108 may encapsulate GPRS packets received from first SGSN/intermediate router 106a into an appropriate packet data protocol (PDP) format (e.g., IP or X.25) and send packets out on the corresponding packet data network. GGSN/PGW 108 may further store a current SGSN address associated with a user and his or her profile in a location register of GGSN/PGW 108. GGSN/PGW 108 may further be responsible for IP address assignment and is the default router for connected user equipment (UE) 102a-102b. GGSN/PGW 108 may further perform authentication, billing/charging functions and other functions via core network services 110. Communication system 100 may further include an IP backhaul from the RAN to GGSN/PGW 108.

First base station 104a includes a first transport layer function proxy component 118a, and second base station 104b includes a second transport layer function proxy component 118b. GGSN/PGW 108 includes a transport layer function manager component 120. In accordance with various embodiments, each of first transport layer function proxy component 118a, second transport layer function proxy component 118b, and transport layer function manager component 120 may include one or more software components, one or more hardware components, or a combination of software and hardware components. First transport layer function proxy component 118a is in communication with transport layer function manager component 120 using a first control channel 122a established between first transport layer function proxy component 118a and transport layer function manager component 120. Similarly, second transport layer function proxy component 118b is in communication with transport layer function manager component 120 using a second control channel 122b established between second transport layer function proxy component 118b and transport layer function manager component 120. In one or more embodiments, first control channel 122a and second control channel 122b are each an out-of-band channel established between the respective transport layer function proxy components 118a-118b and transport layer function manager component 120. In still other embodiments, first control channel 122a and second control channel 122b are in-band channels. Communication system 100 further includes a remote server 124 in communication with GGSN/PGW 108. In a particular embodiment, remote server 124 includes a Transmission Control Protocol (TCP) server.

In accordance with various embodiments, first transport layer function proxy component 118a and second transport layer function proxy component 118b are each embedded as a cell-site transport layer function proxy, such as a cell-site Transmission Control Protocol (TCP) proxy, as an in-line service on first base station 104a and second base station 104b, respectively. In one or more embodiments, first transport layer function proxy component 118a is configured to control and optimize transport layer performance, such as TCP performance, specifically for a wireless channel (such as a cellular wireless channel) between first base station 104a and first user equipment 102a. Similarly, in one or more embodiments, second transport layer function proxy component 118b is configured to control and optimize transport layer performance specifically for a wireless channel between second base station 104b and second user equipment 102b.

In particular embodiments, first transport layer function proxy component 118a and second transport layer function proxy component 118b may implement one or more TCP optimization techniques ranging from sending selective ACKs, dynamic window resizing, ACK pacing and other well-known TCP optimization techniques to adjust the TCP operating parameters to the actual cellular channel conditions. In various embodiments, transport layer function manager component 120 is configured to manage transport layer state mobility, such as TCP state mobility, between cell sites when a mobile node relocates between base stations by relocating the transport mobility state between the base stations. For example, if first user equipment 102a experiences handover from first base station 104a to second base station 102b, transport layer function manager component 120 may be configured to receive the transport mobility state associated with first user equipment 102a from first transport layer function proxy component 118a, and send the transport mobility state to second transport layer function proxy component 118b by way of transport layer function manager 120. Second transport layer function proxy component 118b may then implement the transport mobility state for the wireless channel between second base station 108b and first user equipment 108b.

Each of the elements of FIG. 1 may couple to one another through simple interfaces (as illustrated), or through any other suitable connection (wired or wireless), which can provide a viable pathway for network communications. Additionally, any one or more of these elements may be combined or removed from the architecture based on particular configuration needs. Communication system 100 may facilitate transmission control protocol/Internet protocol (TCP/IP) communications for the transmission or reception of packets in a network, and may operate in conjunction with a user datagram protocol/IP (UDP/IP), or any other suitable protocol where appropriate and based on particular needs.

Communication system 100 may be tied to the 3rd Generation Partnership Project (3GPP) Evolved Packet System architecture, but alternatively this depicted architecture may be equally applicable to other environments such as a 4G LTE network. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks can be performed via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that first user equipment 102a and second user equipment 102b can be associated with clients, customers, or end users wishing to initiate a communication in system 100 via some network. In one particular example, first user equipment 102a and second user equipment 102b reflects devices configured to generate wireless network traffic. The term 'endpoint' and 'end-station' are included within the broad term user equipment, as used herein. First user equipment 102a and second user equipment 102b can include devices used to initiate a communication, such as a computer, a personal digital assistant (PDA), a laptop or electronic notebook, a cellular telephone, an iPhone, a Blackberry, an Android, a smartphone, a tablet, an iPad, an IP phone, or any other device, component, element, equipment, or object capable of initiating voice, audio, video, media, or data exchanges within communication system 100. First user equipment 102a and second user equipment 102b may also include a suitable interface to the human user, such as a microphone, a display, or a keyboard or other terminal equipment. First user equipment 102a and second user equipment 102b may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

For purposes of illustrating certain example techniques of communication system 100, it is important to understand the communications that may be traversing the network. The following foundational information may be viewed as a basis from which the present disclosure may be properly explained. IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets.

The term packet is used to refer to data plane packets, control plane packets, and management plane packets. In general, the data plane (also known as the forwarding plane, or the user plane) provides the ability to forward data packets; the control plane provides the ability to route data correctly; and the management plane provides the ability to manage network elements. For normal IP packet processing, an IP router typically has a data plane, a control plane, and a management plane. The IP packets themselves support all of the planes for any IP-based protocol, and the IP router has no inherent knowledge about whether each IP packet is a data, control, or management plane packet.

The vast majority of packets handled by a router travel through the router via the data plane. Data plane packets typically consist of end-station, user-generated packets, which are forwarded by network devices to other end-station devices. Data plane packets may have a transit destination IP address, and they can be handled by normal, destination IP address-based forwarding processes. Service plane packets can be a special type of data plane packets. Service plane packets are also user-generated packets, which may be forwarded by network elements to other end-station devices; however, they may require high-touch handling by a network element (above and beyond normal, destination IP address-based forwarding) to properly forward the packet.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on an IP router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station that are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP).

Some Radio Access Network (RAN) vendors enable the execution of "services" inside a base station. These services may run as an application on virtual machines, and the virtual machines may be hosted on the base station's processing infrastructure. All (GTP-based) traffic sent from and received by the base station is routed through the base station hosted "services" to enable in-line service delivery on per-subscriber packet stream. The idea is that by hosting services in the base station, caching, storing and latency saving functions can execute and optimize for the wireless specifics. These services operate "on-top-of" the cellular infrastructure and are not integrated into the cellular networking standards.

In accordance with various embodiments, transport layer function proxy 118 operates a transport layer function proxy service as one of the base station's services that may potentially improve transport layer performance over a cellular wireless channel. In a particular embodiment, the transport layer function proxy located at the cell-site provides a back-to-back TCP session between a mobile node and remote server 124, such as a remote TCP server. When a mobile node establishes a TCP session to remote server 124, the cell-site TCP proxy in the base station intercepts all packets, and re-originates the TCP session from the base station as if the call originated from the mobile node. An advantage of this approach is that the TCP session that runs between the mobile node and the cell-site TCP proxy can be optimized specifically for communication over the cellular channel, while the TCP session between the cell-site TCP proxy and remote server 124 can be operated normally using indirect TCP (I-TCP). Particular TCP optimizations for delivery of TCP packets over the cellular wireless channel may include selective TCP packet acknowledgements, ACK packing, dynamic window resizing or other well-known TCP optimization techniques.

In a particular example, when a mobile node such as first user equipment 102a establishes a TCP session through first transport layer function proxy 118a operating at the cell site associated with first base station 118a, first user equipment 102a creates transport layer state managed by first transport layer function proxy 118a. In at least one embodiment, the transport layer state parameters may include protocol control blocks (PCBs) of the TCP communication channel between first user equipment 102a and first transport layer function proxy 118a and the PCB for the TCP communication channel between first transport layer function proxy 118a and remote server 124. This PCB may hold (congestion) window parameters, sequence numbers, and potentially received packets. When first user equipment 102a relocates between first base station 104a and second base station 104b, second transport layer function proxy 118b requests the transport layer state from first transport layer function proxy 118a. In accordance with various embodiments, transport layer function manager 120 manages address assignment for the re-originated transport layer session, and tracks which cell-site proxies maintain which transport layer sessions. It should be noted that while various embodiments describe mobility of a transport layer proxy, such as a TCP proxy, between two base stations it should be understood that the principles described herein may be applicable to other situations such as relocating TCP proxies between two virtual machines operated in a data center hosting the TCP proxies as well as supporting mobility events of other types of applications hosted in the base station.

In accordance with various embodiments, to manage terminating and re-originating transport layer sessions, such as TCP sessions, at the cell-site, first transport layer function proxy 118a handles the termination the TCP sessions over the cellular wireless communication channel and the re-origination of the TCP session at the cell-site, whereas transport layer function manager 120 keeps track of which cell site transport layer function proxy 118a-118b maintains what TCP sessions (i.e., PCBs). In the event of a mobility operation, in one or more embodiments, transport layer function manager 120 uses an out-of-band communication channel to the particular cell-site transport layer function proxy 118a-118b to obtain the state associated with the TCP sessions.

A TCP session is typically initiated by a mobile node, such as first user equipment 102a, transmitting a TCP synchronize (SYN) packet. The TCP SYN packet is captured by first transport layer function proxy 118a hosted on first base station 104a as an indicator a new re-origination request is needed. In a particular embodiment, first transport layer function proxy 118a is hosted on first base station 104a by a virtual machine. The first transport layer function proxy 118a allocates two PCBs: one PCB to terminate the cellular TCP session and one PCB to establish a new session towards remote server 124. First transport layer function proxy 118a informs transport layer function manager 120 of the session parameters (e.g., source IP address, destination IP address, source TCP port, destination TCP port) by way of first control channel 122a between first transport layer function proxy 118a and transport layer function manager 120. In a particular embodiment, first control channel 122a is an out-of-band control channel between first transport layer function proxy 118a and transport layer function manager 120. First transport layer function proxy 118a then forwards the TCP SYN packet to remote server 124.

In normal operation, first transport layer function proxy 118a operates both ends of the TCP session by copying TCP control messages and data from one TCP session onto the other while optimizing the cellular TCP channel with optimization techniques. As previously discussed one or more well-known TCP optimization techniques may be used.

When first user equipment 102a relocates between first base station 104a and second base station 104b, first user equipment 102a expects its TCP sessions to persist. As a result, it is desirable to relocate the PCBs associated with the TCP session from first base station 104a to second base station 104b. Since in particular embodiments, the TCP proxies are operated essentially "over-the-top" inside the base station, the PCB relocation procedure cannot normally make use of existing cellular-based relocation techniques. Instead, a cell-site TCP proxy relies on transport layer function manager 120 to record which virtual machine on which base station holds the PCBs for the TCP session that needs to be continued. In particular embodiments, transport layer function manager 120 may record this information in a network addressable form.

On the occurrence of a mobility event, such as a handover, and the receiving of a first uplink TCP packet from first user equipment 102a, where this packet is not a SYN packet, second transport layer function proxy 118b of second base station 104b (the new base station's cell-site TCP proxy) sends an indication to transport layer function manager 120 that second transport layer function proxy 118b has no knowledge of the TCP session since second transport layer function proxy 118b has not previously received an uplink TCP packet from first user equipment 102a relating to a previous TCP session associated with first user equipment 102a. The indication indicates to transport layer function manager 120 that second transport layer function proxy 118b lacks the PCBs associated with the TCP session associated with first user equipment 102a. If transport layer function manager 120 also has no knowledge of the TCP session, it indicates this to the second transport layer function proxy 118b which can respond accordingly to first user equipment 102a such as by sending an ICMP-UNREACH message indicating that the TCP session is unreachable. If transport layer function manager 120 has knowledge of the TCP session, transport layer function manager 120 may either obtain the TCP PCB state directly from first transport layer function proxy 118a and forward the TCP PCB state data to second transport layer function proxy 118b; or alternately, transport layer function manager 120 may inform second transport layer function proxy 118b of the location of first transport layer function proxy 118a (the former cell-site TCP proxy associated with first user equipment 102a) to enable the second transport layer function proxy 118b to obtain the TCP PCB state itself directly from first transport layer function proxy 118a. As a result, all PCB state for a mobile node's TCP (or other transport layer) sessions may be relocated between cell sites in the event of the occurrence of a mobility event. In some embodiments, the cell site TCP proxy may buffer data between indirect TCP sessions, and this data can be forwarded through the same mechanism. In one or more embodiments, data buffered in the base station may be forwarded by regular cellular techniques such as using a 3GPP X2 interface.

When second transport layer function proxy 118b has obtained the TCP PCB state previously associated with first transport layer function proxy 118a, second transport layer function proxy 118b reverts to "normal operation" and continues the TCP session using the same TCP PCB state parameters as those used by first transport layer function proxy 118a.

If a TCP session terminates, it is the responsibility of the particular cell-site proxy (first transport layer function proxy 118a or second transport layer function proxy 118b) to inform transport layer function manager 120 that the TCP session no longer exists. In response, in particular embodiments transport layer function manager 120 clears may clear out its state information for the TCP session. In one or more embodiments, first transport layer function proxy 118a, second transport layer function proxy 118b, and transport layer function manager 120 may use existing TCP techniques (e.g. similar to those use by NA(P)T functions) to time-out TCP sessions that have become unresponsive. In some embodiments, if the mobility procedure of the PCB state between the two cell-site TCP proxies fails, for some reason (e.g., missing packets, no communication, or other reasons), TCP reset messages (TCP RSTs) or other message may be sent over both TCP sessions, or both TCP sessions may be enabled to time out after a predetermined time period has elapsed.

Figure 2:
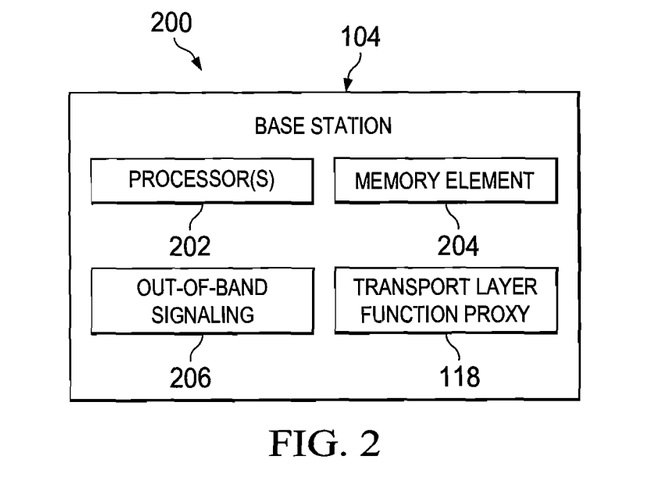
FIG. 2 is a simplified block diagram illustrating a particular embodiment of the first base station of the communication system of FIG. 1.

FIG. 2 is a simplified block diagram 200 illustrating a particular embodiment of first base station 104a of communication system 100 of FIG. 1. First base station 104a includes one or more processor(s) 202a, a memory element 204a, an out-of-band signaling component 206, and transport layer function proxy component 118. Processor(s) 202 are configured to execute software instructions to perform various operations of base station 104a as described herein. Memory element 204 may be configured to store software instructions and data associated with base station 104a. Out-of-band signaling component 206 is configured to establish an out-of-band control channel, such as first control channel 122a, with transport layer function manager component 120 of GGSN/PGW 108. Transport layer function proxy component 118 is configured to implement the various transport layer proxying operations as described herein. In one or more embodiments, second base station 104b may be implemented in a similar manner as first base station 104a.

Although the particular embodiment illustrated in FIG. 2 shows base station 104a as including a single node, it should be understood that in other embodiments base station 104a may include any number of nodes. In still other embodiments, a cluster may be formed of any number of processing nodes distributed throughout a number of servers or other network elements within a communication network.

Figure 3:
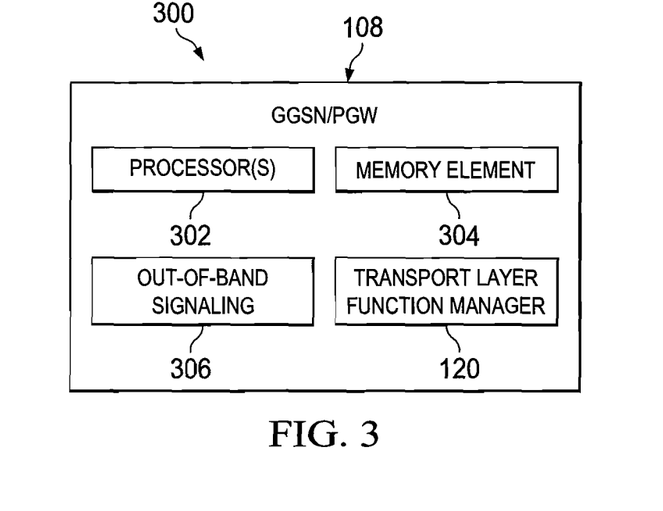
FIG. 3 is a simplified block diagram illustrating a particular embodiment of the GGSN/PGW of the communication system of FIG. 1.

FIG. 3 is a simplified block diagram 300 illustrating a particular embodiment of GGSN/PGW 108 of communication system 100 of FIG. 1. GGSN/PGW 108 includes one or more processor(s) 302, a memory element 304, out-of-band signaling component 306, and transport layer function manager component 120. Processor(s) 302 are configured to execute software instructions to perform various operations of GGSN/PGW 108 as described herein. Memory element 304 may be configured to store software instructions and data associated with GGSN/PGW 108. Out-of-band signaling component 306 is configured to establish an out-of-band control channel, such as first control channel 122a, with first transport layer function proxy 118a of base station 104a. Transport layer function manager component 120 is configured to implement the various transport layer function manager operations as described herein.

Although the particular embodiment illustrated in FIG. 3 shows GGSN/PGW 108 as including a single node, it should be understood that in other embodiments GGSN/PGW 108 may include any number of nodes. In still other embodiments, a cluster may be formed of any number of processing nodes distributed throughout a number of servers or other network elements within a communication network.

Note that in certain example implementations, the data communication and routing functions outlined herein may be implemented by logic encoded in one or more tangible media (e.g., embedded logic provided in an application specific integrated circuit [ASIC], network processors, digital signal processor [DSP] instructions, software [potentially inclusive of object code and source code] to be executed by a processor, or other similar machine, etc.). In some of these instances, a memory element (as shown in FIG. 2 and FIG. 3) can store data used for the operations described herein.

This includes the memory element being able to store software, logic, code, or processor instructions that are executed to carry out the activities described in this Specification.

A processor can execute any type of instructions associated with the data to achieve the operations detailed herein in this Specification. In one example, the processor (as shown in FIG. 2 and FIG. 3) could transform an element or an article (e.g., data) from one state or thing to another state or thing. In another example, the data communication and routing activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, base stations 104a-104b and GGSN/PGW 108 may include software in order to achieve the data communication functions outlined herein. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, queues, caches, etc.) should be construed as being encompassed within the broad term 'memory element.' Similarly, any of the potential processing elements, modules, and machines described in this Specification should be construed as being encompassed within the broad term 'processor.' Each of these elements can also include suitable interfaces for receiving, transmitting, and/or otherwise communicating data or information in a network environment.

Base stations 104a-104b and GGSN/PGW 108 are network elements configured to perform the activities disclosed herein. As used herein in this Specification, the term 'network element' may include any suitable hardware, software, components, modules, interfaces, or objects operable to exchange information in a network environment. Further, the term network element as discussed herein encompasses (but is not limited to) devices such as routers, switches, gateways, bridges, loadbalancers, firewalls, inline service nodes, proxies, clients, servers processors, modules, or any other suitable device, component, element, proprietary device, network appliance, or object operable to exchange information in a network environment. This may be inclusive of appropriate algorithms and communication protocols that allow for the effective exchange of data or information.

Figure 4A:
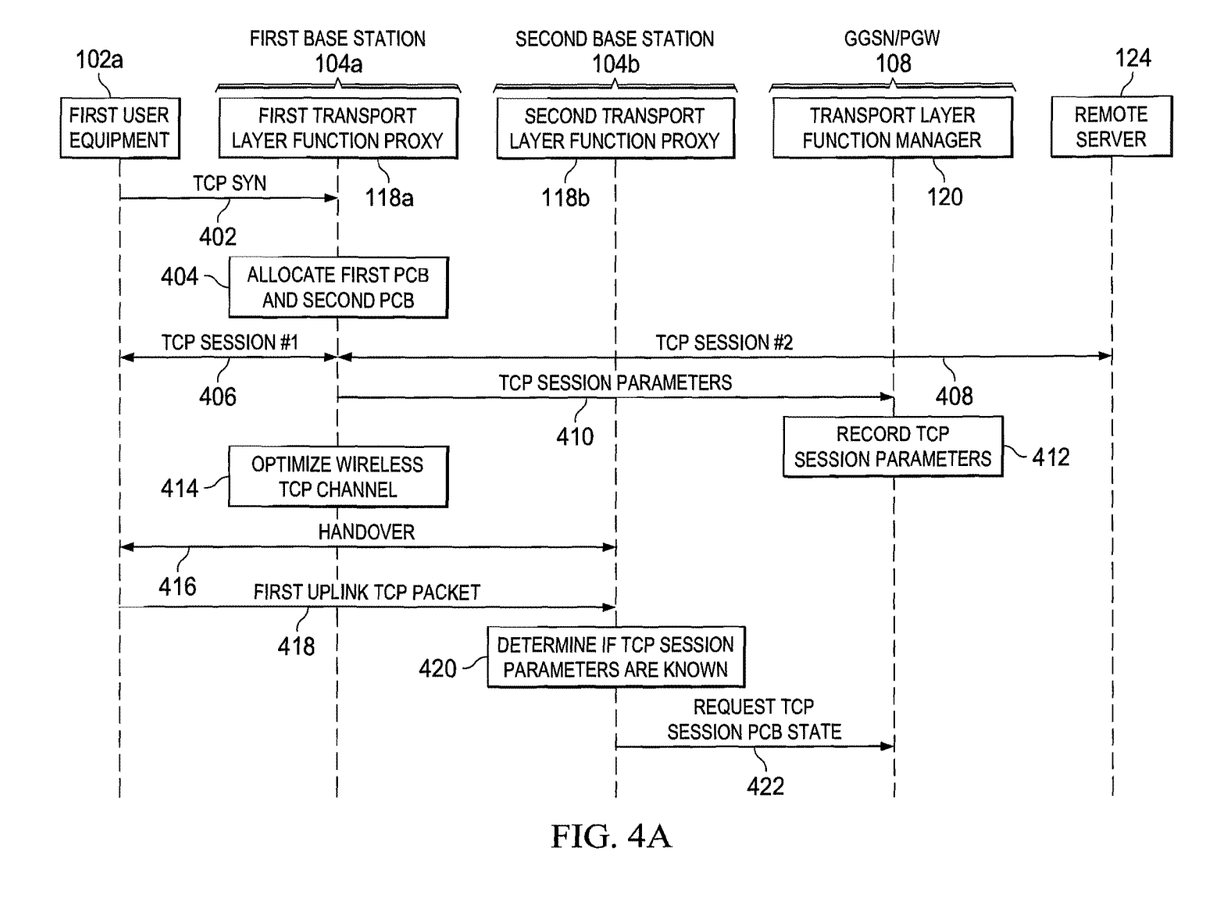
FIGS. 4A-4B are a simplified flow diagram illustrating potential operations of the communication system associated with one embodiment of the present disclosure.
Figure 4B:
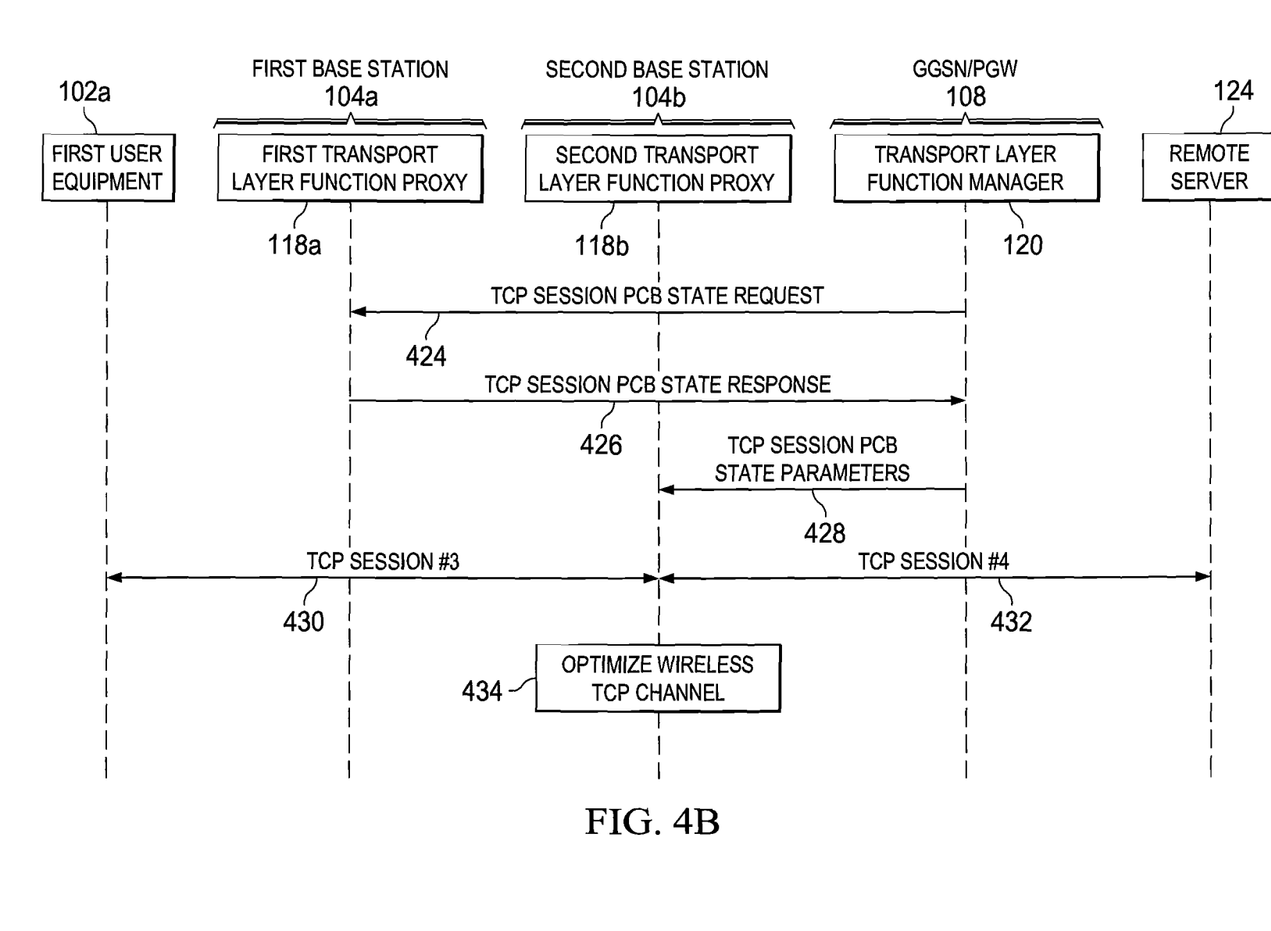

FIGS. 4A-4B are a simplified flow diagram 400 illustrating potential operations of communication system 100 associated with one embodiment of the present disclosure. In 402, first user equipment 102a sends a TCP synchronize (SYN) message to first transport layer function proxy 118a of first base station 104a indicating that first user equipment 102a is requesting the establishment of a user TCP session with remote server 124. In 404, first transport layer function proxy 118a allocates a first PCB to terminate a first wireless TCP session (TCP session #1) between first user equipment 104a and first transport layer function proxy 118a at first transport layer function proxy 118a. First transport layer function proxy 118a further allocates a second PCB to establish a second TCP session (TCP session #2) between first transport layer function proxy 118a and remote server 124. In 406, the first TCP session (TCP session #1) is established between first user equipment 102a and first transport layer function proxy 118a using the first PCB. In 408, the second TCP session (TCP session #2) is established between first transport layer function proxy 118a and remote server 124 using the second PCB. In a particular embodiment, first transport layer function proxy 118a forwards the TCP SYN message to remote server 124 as part of establishing the TCP session. First transport layer function proxy 118a may then operate both ends of the TCP session by copying TCP control messages and data between the first TCP session (TCP session #1) and the second TCP session (TCP session #2) in order to maintain the overall user TCP session between first user equipment 102a and remote server 124.

In 410, first transport layer function proxy 118a sends the TCP session parameters, such as the PCB information, to transport layer function manager 120 using first control channel 122a. In a particular embodiment, the first control channel 122a is an out-of-band control channel established between first transport layer function proxy 118a and transport layer function manager 120. In a particular embodiment, the TCP session parameters may include a source IP address, a destination IP address, a source port, and a destination port associated with the TCP session. In 412, transport layer function manager 120 records or stores the TCP session parameters associated with first transport layer function proxy 118a within a memory.

In 414, first transport layer function proxy 118a may optimize the wireless TCP channel between first user equipment 102a and first base station 104a using one or more TCP optimization techniques such as sending selective acknowledgements, implementing dynamic window resizing, acknowledgement pacing and other TCP optimization techniques. In 416, first user equipment 102a experiences a handover or other mobilization event between first base station 104a and second base station 104b. In 418, second transport layer function proxy 118b of second base station 104b receives a first uplink TCP packet from first user equipment 102a. In 420, second transport layer function proxy 118b determines if the TCP session parameters associated with the first uplink TCP packet are known to second transport layer function proxy 118b. Since in this particular example, second transport layer function proxy 118b has not previously received a TCP packet associated with the current TCP from first user equipment 102a, second transport layer function proxy 118b determines that the TCP session parameters are not known.

In 422, second transport layer function proxy 118b sends a request for the TCP session PCB state parameters to transport layer function manager 120 within GGSN/PGW 108 of the core network. In 424, transport layer function manager 120 sends a TCP session PCB state request message to first transport layer function proxy 118a requesting the TCP session PCB state parameters associated with the TCP session from first transport layer function proxy 118a. In 426, first transport layer function proxy 118a sends a TCP session PCB state response message including the TCP session PCB state parameters to transport layer function manager 120. In 428, transport layer function manager 120 provides the TCP session PCB state parameters to second transport layer function proxy 118b. In an alternative embodiment, transport layer function manager 120 may send an indication to second transport layer function proxy 118b that the TCP session PCB state parameters may be obtained by second transport layer function proxy 118b from first transport layer function proxy 118a rather than directly providing the TCP session PCB state parameters from transport layer function manager 120.

In 430, second transport layer function proxy 118*b* establishes a third TCP session (TCP session #3) with first user equipment 102*a* using the TCP session PCB state parameters obtained from first transport layer function proxy 118*a*. In 432, second transport layer function proxy 118*b* establishes a fourth TCP session (TCP session #4) with remote server 124 using the TCP session PCB state parameters obtained from first transport layer function proxy 118*a*. Second transport layer function proxy 118*b* may then operate both ends of the TCP session by copying TCP control messages and data between the third TCP session (TCP session #3) and the fourth TCP session (TCP session #4) in order to maintain the overall TCP session between first user equipment 102*a* and remote server 124. In 434, second transport layer function proxy 118*b* may optimize the wireless TCP channel between first user equipment 102*a* and second base station 104*b* using one or more TCP optimization techniques such as sending selective acknowledgements, implementing dynamic window resizing, acknowledgement pacing and other TCP optimization techniques.

Figure 5:
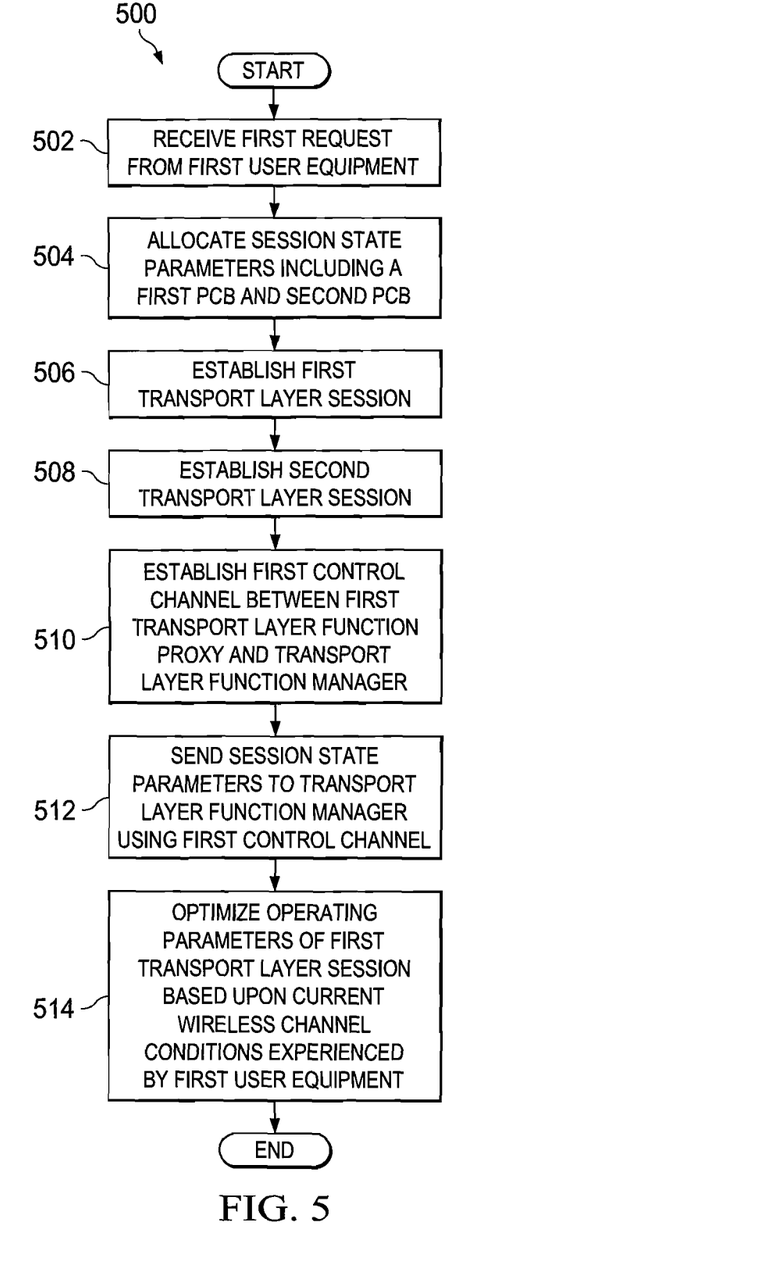
FIG. 5 is simplified flowchart illustrating potential operations associated with a first transport layer function proxy according to one embodiment of the present disclosure.

FIG. 5 is simplified flowchart 500 illustrating potential operations associated with first transport layer function proxy 118*a* according to one embodiment of the present disclosure. In 502, first transport layer function proxy 118*a* located within first base station 104*a* of the radio access network receives a first request from first user equipment 102*a*. The first request includes a request to establish a user session between first user equipment 102*a* and remote server 124. In 504, first transport layer function proxy 118*a* allocates session state parameters to a first transport layer session and a second transport layer session. The session state parameters include a first protocol control block (PCB) associated with the first transport layer session and a second protocol control block (PCB) associated with the second transport layer session. In a particular embodiment, one or more of the first protocol control block and the second protocol control block include one or more of a source network address (e.g. a source IP address), a destination network address (e.g., a destination IP address), a source port, and a destination port associated with the user session.

In 506, first transport layer function proxy 118*a* establishes a first transport layer session between first user equipment 102*a* and first transport layer function proxy 118*a*. In 508, first transport layer function proxy 118*a* establishes a second transport layer session between first transport layer function proxy 118*a* and remote server 124. In 510, first transport layer function proxy 118*a* establishes a first control channel between first transport layer function proxy 118*a* and transport layer function manager 120 within the core network. In a particular embodiment, the first control channel is an out-of-band channel between first transport layer function proxy 118*a* and transport layer function manager 120. In 512, first transport layer function proxy 118*a* sends the session state parameters associated with the first transport layer session and the second transport layer session to the transport layer function manager 120 using the first control channel. In one or more embodiments, first transport layer function proxy 118*a* may further send network address information of the first transport layer function proxy 118*a* to transport layer function manager.

In 514, first transport layer function proxy 118*a* optimizes operating parameters of the first transport layer session based upon wireless channel conditions experienced by first user equipment 118*a*. The operations then end.

Figure 6:
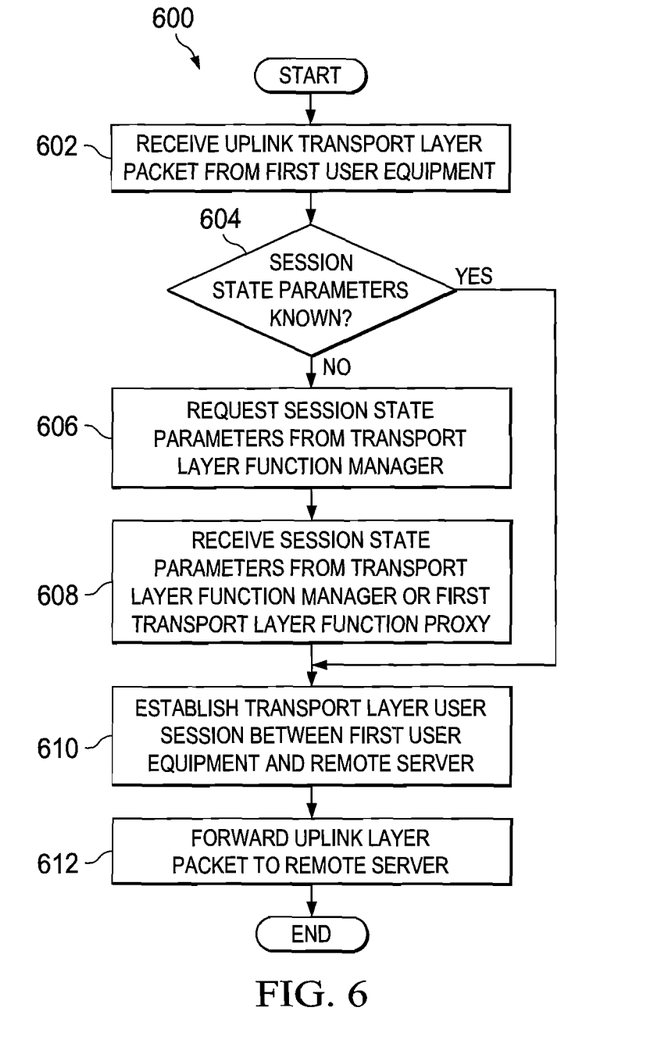
FIG. 6 is simplified flowchart illustrating potential operations associated with a second transport layer function proxy according to one embodiment of the present disclosure.

FIG. 6 is simplified flowchart 600 illustrating potential operations associated with second transport layer function proxy 118*b* according to one embodiment of the present disclosure. In 602, second transport layer proxy 118*b* receives an uplink transport layer packet associated with the user session from first user equipment 102*a*. In a particular embodiment, the uplink transport layer packet is received by second transport layer function proxy 118*b* when first user equipment 102*a* experiences handover between first base station 104*a* including first transport layer function proxy 118*a* and second base station 104*b* including second transport layer function proxy 118*b*. In 602, second transport layer function proxy 118*b* determines whether the session state parameters associated with the user session are known to second transport layer function proxy 118*b*. If the session state parameters are known to second transport layer function proxy 118*b*, the operations continue to step 610 which will be further described below.

If the session state parameters are not known to second transport layer function proxy 118*b*, second transport layer function proxy 118*b* requests the session state parameters from transport layer function manager 120 in 606. In 608, second transport layer function proxy 118*b* receives the session state parameters associated with the user session from either transport layer function manager 120 or from first transport layer function proxy 118*b*. In some embodiments, transport layer function manager 120 receives the session state parameters from first transport layer function proxy 120 and provides the session state parameters to second transport layer function proxy 118*b*. In a particular embodiment, transport layer function manager 120 receives the request for session state parameters and sends the second state parameters via a second control channel established between transport layer function manager 120 and second transport layer function protocol 118*b*. In still other embodiment, transport layer function manager 120 provides second transport layer function proxy 118*b* with the location of first transport layer function proxy 118*a*, and second transport layer function proxy 118*b* requests the session state parameters directly from first transport layer function proxy 118*a*.

In 610, second transport layer function proxy 118*b* establishes a transport layer user session between first user equipment 102*a* and remote server 124 using the user session state parameters. In at least one embodiment, the transport layer user session is established by second transport layer function proxy establishing a first transport layer session between first user equipment 102*a* and second transport layer function proxy 118*b*, and a second transport layer session between second transport layer function proxy 118*b* and remote server 124. In 612, second transport layer function proxy 118*b* forwards the uplink transport layer packet to remote server 120 using the established transport layer user session. The operations then end.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible scenarios and patterns that may be executed by, or within, communication system 100. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. It is also imperative to note that the architecture outlined herein can be used in different types of network applications. The architecture of the present disclosure can readily be used such environments, as the teachings of the present disclosure are equally applicable to all such alternatives and permutations.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a first request from a first user equipment by a first transport layer proxy located within an access network, the first request including a request to establish a user session between the first user equipment and a remote server;
   establishing a first transport layer session between the first user equipment and the first transport layer proxy;
   establishing a second transport layer session between the first transport layer proxy and the remote server;
   establishing a first control channel between the first transport layer proxy and a transport layer function manager within a core network;
   sending session state parameters associated with the first transport layer session and the second transport layer session to the transport layer function manager using the first control channel;
   storing the session state parameters within the core network by the transport layer function manager;
   receiving an uplink transport layer packet associated with the user session by a second transport layer proxy located within the access network from the first user equipment;
   determining whether the session state parameters associated with the user session are known to the second transport layer proxy; and
   requesting, by the second transport layer proxy, the session state parameters from the transport layer function manager when the session state parameters are not known to the second transport layer proxy, wherein the transport layer function manager is configured to request the session state parameters from the first transport layer proxy responsive to receiving the request from the second transport layer proxy, and send the session state parameters to the second transport layer proxy.

2. The method of claim 1, further comprising sending network address information of the first transport layer proxy to the transport layer function manager.

3. The method of claim 1, further comprising allocating the session state parameters to the first transport layer session and the second transport layer session by the first transport layer proxy.

4. The method of claim 1, wherein the session state parameters include a first protocol control block associated with the first transport layer session and a second protocol control block associated with the second transport layer session.

5. The method of claim 4, wherein at least one of the first protocol control block and the second protocol control block include one or more of a source network address, a destination network address, a source port, and a destination port associated with the user session.

6. The method of claim 1, wherein the control channel is an out-of-band channel between the first transport layer proxy and the transport layer function manager.

7. The method of claim 1, further comprising optimizing operating parameters of the first transport layer session based upon wireless channel conditions experienced by the first user equipment.

8. The method claim 1, wherein the first transport layer proxy resides within a first base station.

9. The method of claim 1, wherein the transport layer function manager resides within a packet gateway.

10. The method of claim 1, further comprising:
    receiving the session state parameters from the transport layer function manager.

11. The method of claim 10, further comprising:
    establishing a transport layer user session between the first user equipment and the remote server using the session state parameters; and
    forwarding the uplink transport layer packet to the remote server by the second transport layer proxy using the transport layer user session.

12. The method of claim 10, wherein the uplink transport layer packet is received by the second transport layer proxy when the first user equipment experiences handover between a first base station including the first transport layer proxy and a second base station including the second transport layer proxy.

13. One or more non-transitory tangible media that includes code for execution and when executed by a processor operable to perform operations comprising:
    receiving a first request from a first user equipment by a first transport layer proxy located within an access network, the first request including a request to establish a user session between the first user equipment and a remote server;
    establishing a first transport layer session between the first user equipment and the first transport layer proxy;

establishing a second transport layer session between the first transport layer proxy and the remote server;
establishing a first control channel between the first transport layer proxy and a transport layer function manager within a core network;
sending session state parameters associated with the first transport layer session and the second transport layer session to the transport layer function manager using the first control channel;
storing the session state parameters within the core network by the transport layer function manager;
receiving an uplink transport layer packet associated with the user session by a second transport layer proxy located within the access network from the first user equipment;
determining whether the session state parameters associated with the user session are known to the second transport layer proxy; and
requesting, by the second transport layer proxy, the session state parameters from the transport layer function manager when the session state parameters are not known to the second transport layer proxy, wherein the transport layer function manager is configured to request the session state parameters from the first transport layer proxy responsive to receiving the request from the second transport layer proxy, and send the session state parameters to the second transport layer proxy.

14. The media of claim 13, wherein the operations further include allocating the session state parameters to the first transport layer session and the second transport layer session by the first transport layer proxy.

15. The media of claim 13, wherein the session state parameters include a first protocol control block associated with the first transport layer session and a second protocol control block associated with the second transport layer session.

16. The media of claim 15, wherein at least one of the first protocol control block and the second protocol control block include one or more of a source network address, a destination network address, a source port, and a destination port associated with the user session.

17. The media of claim 13, wherein the control channel is an out-of-band channel between the first transport layer proxy and the transport layer function manager.

18. The media of claim 13, wherein the operations further include optimizing operating parameters of the first transport layer session based upon wireless channel conditions experienced by the first user equipment.

19. The media of claim 13, wherein the operations further include:
receiving the session state parameters from the transport layer function manager.

20. The media of claim 19, wherein the operations further include:
establishing a transport layer user session between the first user equipment and the remote server using the session state parameters; and
forwarding the uplink transport layer packet to the remote server by the second transport layer proxy using the transport layer user session.

21. The media of claim 19, wherein the uplink transport layer packet is received by the second transport layer proxy when the first user equipment experiences handover between a first base station including the first transport layer proxy and a second base station including the second transport layer proxy.

22. An apparatus, comprising:
a memory element configured to store data,
a processor operable to execute instructions associated with the data, and
at least one module being configured to:
receive a first request from a first user equipment by a first transport layer proxy located within an access network, the first request including a request to establish a user session between the first user equipment and a remote server;
establish a first transport layer session between the first user equipment and the first transport layer proxy;
establish a second transport layer session between the first transport layer proxy and the remote server;
establish a first control channel between the first transport layer proxy and a transport layer function manager within a core network;
send session state parameters associated with the first transport layer session and the second transport layer session to the transport layer function manager using the first control channel; and
store the session state parameters within the core network by the transport layer function manager;
receive an uplink transport layer packet associated with the user session by a second transport layer proxy located within the access network from the first user equipment;
determine whether the session state parameters associated with the user session are known to the second transport layer proxy; and
request, by the second transport layer proxy, the session state parameters from the transport layer function manager when the session state parameters are not known to the second transport layer proxy, wherein the transport layer function manager is configured to request the session state parameters from the first transport layer proxy responsive to receiving the request from the second transport layer proxy, and send the session state parameters to the second transport layer proxy.

23. The apparatus of claim 22, wherein the at least one module is further configured to allocate the session state parameters to the first transport layer session and the second transport layer session by the first transport layer proxy.

24. The apparatus of claim 22, wherein the session state parameters include a first protocol control block associated with the first transport layer session and a second protocol control block associated with the second transport layer session.

25. The apparatus of claim 22, wherein at least one of the first protocol control block and the second protocol control block include one or more of a source network address, a destination network address, a source port, and a destination port associated with the user session.

26. The apparatus of claim 22, wherein the first control channel is an out-of-band channel between the first transport layer proxy and the transport layer function manager.

27. The apparatus of claim 22, wherein the at least one module is further configured to optimize operating parameters of the first transport layer session based upon wireless channel conditions experienced by the first user equipment.

* * * * *